April 30, 1968     D. L. WILSON     3,380,207
HIGH RISE MOBILE HOME STRUCTURE
Filed July 26, 1965     2 Sheets-Sheet 1
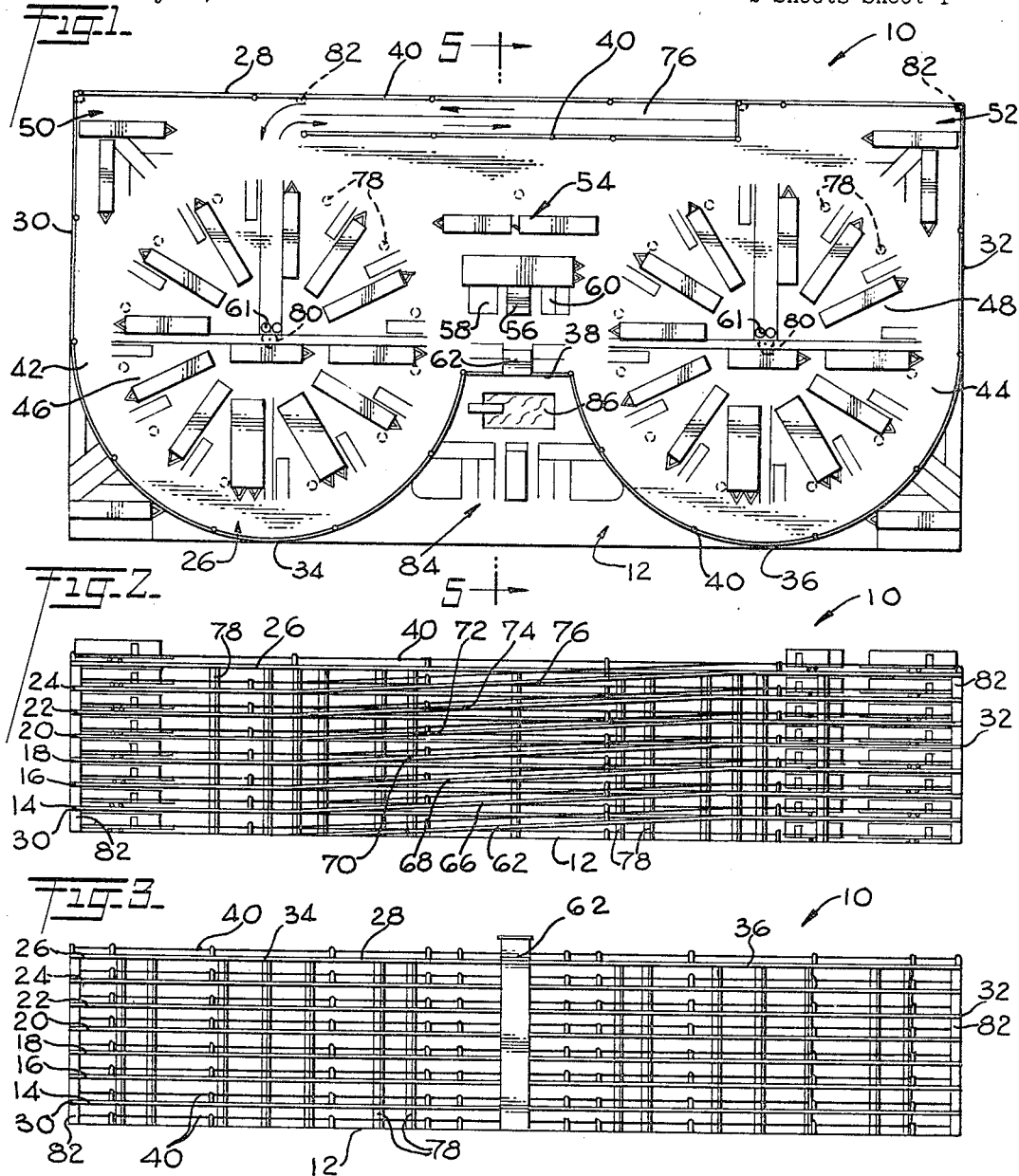
INVENTOR.
DAVID L. WILSON
BY
EDWARD D. O'BRIAN,
ATTORNEY.

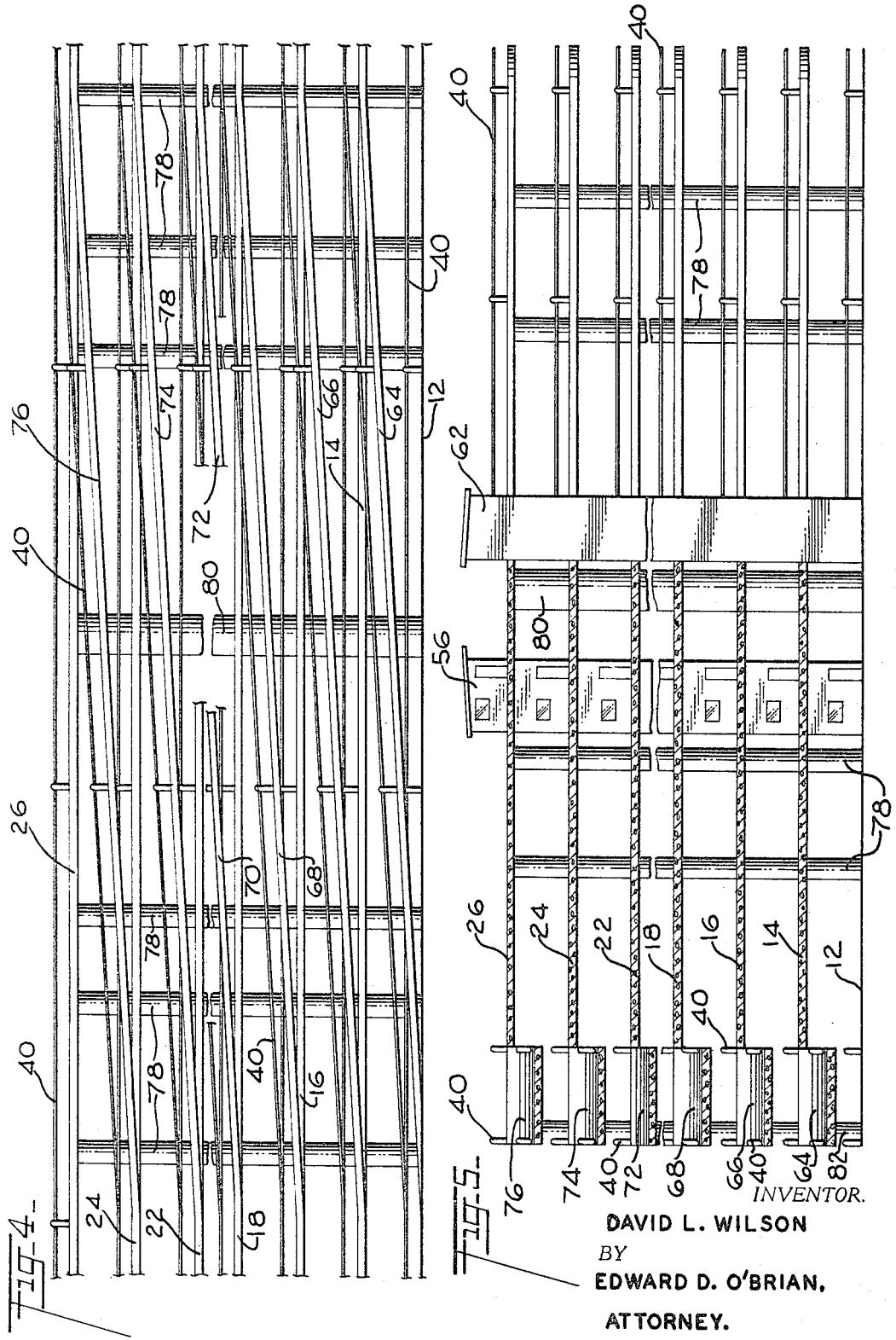

United States Patent Office 3,380,207
Patented Apr. 30, 1968

3,380,207
HIGH RISE MOBILE HOME STRUCTURE
David L. Wilson, 1931 E. Meats St.,
Orange, Calif. 92667
Filed July 26, 1965, Ser. No. 474,604
1 Claim. (Cl. 52—176)

ABSTRACT OF THE DISCLOSURE

The structure is a structure of a plurality of superposed floors which are each arranged to receive a plurality of mobile homes and thus is a high rise mobile home structure. The structure has first and second roadways on each floor and is arranged with the supporting pillars positioned inwardly of the roadways to eliminate obstructions which would make mobile home movement and positioning upon the several floors more difficult. Furthermore, the ramps are of such size and sufficiently easy grade to permit the movement of mobile homes to positions upon the various floors. Access by automobile and by other means is provided to each floor.

Background

Mobile home parks are proliferating in great number in the United States. These parks provide the services and utilities, the spaces and driveways, the access roads and recreation for the use of those who live in mobile homes. Such arrangements are often called "Parks" for they have a park-like atmosphere and occupy a great land area. Such parks take up a considerable amount of space, and in many of them the population density is not much greater than in a single family residential area. In fact, the population density is often considerably less than in an apartment area. With land values rising, desirable and convenient locations decreasing, and the need for efficient land use becoming a critical factor in many areas, such mobile homes parks are of questionable character. Need has arisen for a concept which permits higher population density while permitting those who desire the mobile home style of living to continue.

Accordingly, it is an object of this invention to provide a high rise mobile home structure which provides a plurality of superposed floors, each equipped for the placement of a plurality of mobile homes or trailers.

It is a further object of this invention to provide such a structure which has all of the utilities necessary and helpful on each floor so as to permit comfortable living on each floor.

It is a further object of this invention to provide proper and convenient access to each floor so that the residents of each floor may conveniently move to and from their mobile homes.

It is another object of this invention to provide access to each floor which comprises both passenger elevators, and ramps suitable for driving automotive vehicles and trailers from ground level to each floor, and down again when desired.

Other objects and advantages of this invention will become apparent from a study of the following portion of this specification, the claims and the attached drawings in which:

FIG. 1 is a top plan view of the high rise mobile home structure of this invention;

FIG. 2 is a rear elevational view thereof;

FIG. 3 is a front elevational view thereof;

FIG. 4 is a partial enlarged rear elevational view thereof with parts broken away; and FIG. 5 is an enlarged section taken generally along the line 5—5 of FIG. 1, with parts broken away.

As an aid to understanding this invention it can be stated in essentially summary form that it is directed to a high rise mobile home structure. The structure comprises a plurality of floors, and each of the floors is arranged for the positioning thereon of a plurality of mobile homes. Each of these floors above the ground floor is supported upon a plurality of posts arranged in such a manner that at least the front outer edges are cantilevered. Furthermore, each of the floors has desirable service and recreation provisions thereon. This includes electric supply, water supply, washroom, laundry room, drying yard, trash disposal chute, walkways, driveways, parking, and elevator service. Furthermore, ramps of adequate length and adequate width are provided from the ground floor to the first floor above and thence from each floor to the one above. These ramps are of adequate size for the convenient access of residents of the structure by their automobiles to any floor. Furthermore, the ramps are of adequate and convenient size and of suitably low grade as to permit them to be usable for the transportation of mobile homes to any floor. Of course, safety features such as night lighting, railings and fire hose service are provided on each floor for the protection of the residents thereof against loss.

This invention will be understood in greater detail by reference to the following portion of this specification wherein the drawings are described in more detail.

Referring now to FIGS. 1 through 3, the high rise mobile home structure of this invention is generally indicated at 10. The structure 10 comprises a ground floor 12 which is provided with suitable footers and foundations to support the floor 12 and the structure above it. There footers and foundations particularly include supporting structure for pillars which support the floors above. The floors above comprise second floor 14, third floor 16, fourth floor 18, fifth floor 20, sixth floor 22, seventh floor 24 and eighth or top floor 26.

Each of the floors 14 through 26, above the ground floor 12, is bordered by a rear edge 28, side edges 30 and 32 and front edges. The front edges comprise substantially semicircular edges 34 and 36 joined together by a short, straight edge 38 near the center of the structure 10. Each of the edges is suitably guarded with rail 40 for safety purposes.

Each of the floors is substantially identical and thus only the eighth or top floor 26 will be described as far as the layout thereof is concerned. As is seen in FIG. 1, circular roadways 42 and 44 are provided. These roadways outline larger circular spaces 46 and 48 which are of sufficient size to be divided up into pie shaped lots or spaces suitable for the placement of even relatively large mobile homes. Furthermore, these spaces are sufficiently large as to provide space for automobile parking adjacent the mobile homes and space for planting or other aesthetic decoration. These circular spaces 46 and 48 provide the major portion of the mobile home parking place suited on each floor, but the rear corner spaces 50 and 52 also provide for a small amount of mobile home parking space outside of the circular roadways. Furthermore, space 54 for further mobile home parking is provided between the circular roadways.

Also provided between the circular roadways 42 and 44 are the necessary service areas. These include a clothes wash house 56 which is adapted to contain automatic washing and drying equipment, and a clothesline yard 58. If desired, restroom 60 can be included on each floor.

A number of services serve to connect each of the floors. For example, a trash chute is preferably placed in the service area at the center of each floor, or alternatively separate trash chutes 61 are provided at the center of each of the circular spaces 46 and 48. Furthermore, an elevator is provided in the elevator shaft 62. The elevator shaft 62 extends all the way to the ground floor 12 and is arranged to be provided with access at each of the floors. Therefore, residents and guests of each of these floors can take the elevator in shaft 62 from any floor to any floor.

In order to provide service for the movement of mobile homes and automobiles to and from each of the floors, ramps are provided. As is seen in FIG. 10, ramp 64 extends from ground floor 12 to second floor 14, ramp 66 extends from second floor 14 to third floor 16, ramp 68 extends from third floor 16 to fourth floor 18, ramp 70 extends from fourth floor 18 to fifth floor 20, ramp 72 extends from fifth floor 20 to sixth floor 22, ramp 74 extends from sixth floor 22 to seventh floor 24 and ramp 76 extends from seventh floor 24 to eighth or top floor 26. Each of the ramps is sufficiently wide to permit passage of automobiles in each direction, and each of the ramps is protected by guard rail 40. Furthermore, the ramps are sufficiently easy grade and are sufficiently wide as to permit the movement of mobile homes therealong. There is sufficient turning space at the bottom and top of each ramp to permit mobile homes to be readily moved to any floor. The ramp structure is shown in greater detail in FIGS. 4 and 5.

In order to support the various floors in their relative positions, and to supply adequate load bearing capabilities of each of the floors, supporting pillars are provided from the ground floor 12 upward to the bottom of the eighth floor 26. Several of these pillars are indicated at 78 wherein they are arranged in generally circular fashion at the interior edges of roadway 42 and 44, as is shown in dotted lines in FIG. 1. Additionally, pillars 80 are preferably of larger diameter and are arranged at the center of each of the circular spaces 46 and 48. The pillars 78 are arranged in such a manner that they define trailer spaces and arranged in such a manner that they do not interfere with the proper utilization of the space on each floor. The edges 34 and 36 are preferably cantilevered from the pillars 78 and 80, for providing best visibility and appearance. However, pillars 82 are arranged along the back edge 28 and at the corners thereof so as to support the portions extending beyond the perimeter of circular roadways 42 and 44.

The ground floor 12 has substantially the same layout as the eighth floor 26. However, it is provided with additional automobile parking places, such as at 84 and recreational facilities such as swimming pool 86. Additionally, the office may be housed on the ground floor together with meeting rooms, recreation rooms and the like. If desired, automobile parking can be provided over a portion of the ground floor, with the remainder devoted to trailer spaces. Thus, a relatively small area has a substantial population density, and each of the floors provides advantages as compared to ordinary mobile park home living. These advantages include better ventilation, view from a higher position, protection by an overhead roof, except on the top floor, to provide protection from adverse elements.

This invention having been described in its preferred embodiment, it is clear that it is susceptible to numerous modifications and changes within the scope of the invention and without the exercise of the inventive faculty. Accordingly, the scope of this invention is defined by the scope of the following claim.

I claim:

1. A high rise mobile home structure, said high rise mobile home structure comprising a plurality of floors positioned one above the other and above ground level, each of said floors having substantially the same outline configuration including a rear edge, first and second sides and a front edge, said front edge presenting two substantially semi-circular edges, first and second circular roadways defined on each of said floors and positioned to be adjacent said semi-circular front edges, said first and second circular roadways defining first and second mobile home spaces, pillars extending from the ground level upwards past each of said floors to the bottom of the topmost floor, said pillars being arranged at the inner limits of each of said first and second roadways so as to eliminate obstructions to said first and second roadways, said rear edges of said floors being substantially straight, a ramp adjacent said rear edge of each of said floors extending from each of said floors to the floors adjacent each of said floors, said ramps being of adequate size and sufficiently easy grade to permit the passage of automobiles and mobile homes therealong from floor to floor within said high rise mobile home structure, said ramps being outside of the first and second circular roadways, additional pillars adjacent said back edge of each of said floors to support said floors adjacent said ramps, an elevator shaft extending from the ground level past each of said floors and adapted to carry an elevator so as to provide elevator access to each of said floors, a clothes wash house on each of said floors, a trash chute extending from the topmost floor downward through sub-adjacent floors to the ground level so as to provide trash disposal facilities on each of said floors, guard rail means on each of said floors and on each of said ramps, whereby each of said floors may be used for the positioning of mobile homes thereon for living purposes.

References Cited

UNITED STATES PATENTS

| | | | |
|---|---|---|---|
| 1,432,131 | 10/1922 | Sturges | 52—175 |
| 1,782,997 | 11/1930 | Muntz | 52—176 |

FOREIGN PATENTS

| | | |
|---|---|---|
| 356,587 | 1931 | Great Britain. |

OTHER REFERENCES

Engineering News-Record, Aug. 19, 1948, pp. 111–113.
Progressive Architecture, June 1959, p. 80.

JOHN E. MURTAGH, *Primary Examiner.*